May 4, 1948. J. R. ORELIND 2,440,782
TWO-WAY PLOW
Filed May 15, 1944 3 Sheets-Sheet 2

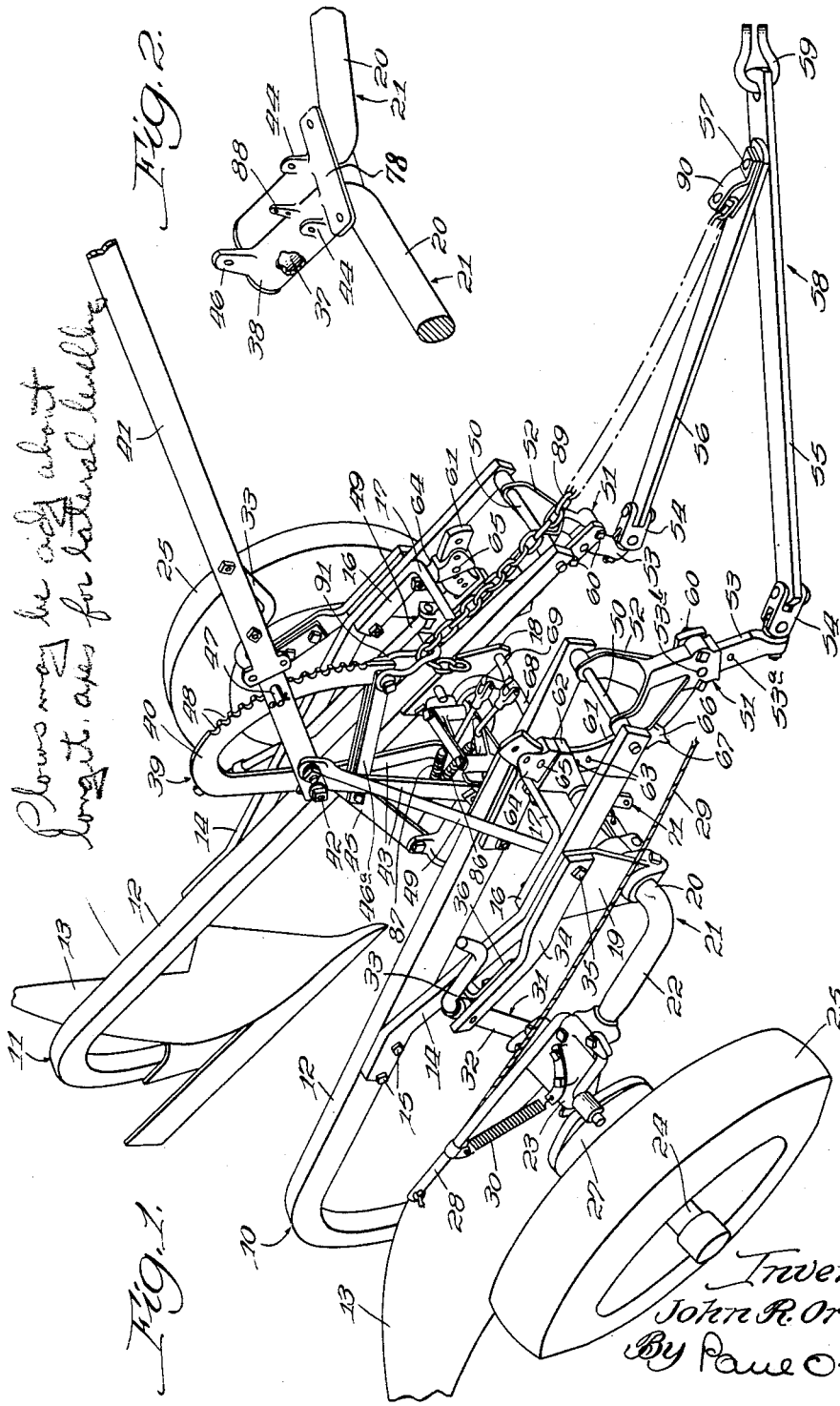

Inventor:
John R. Orelind.
By Paul O. Pippel
Atty.

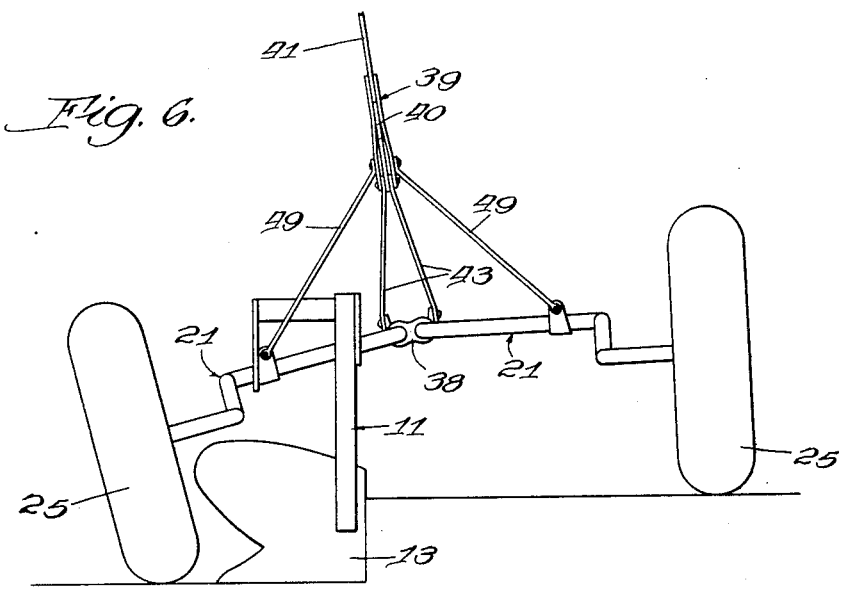
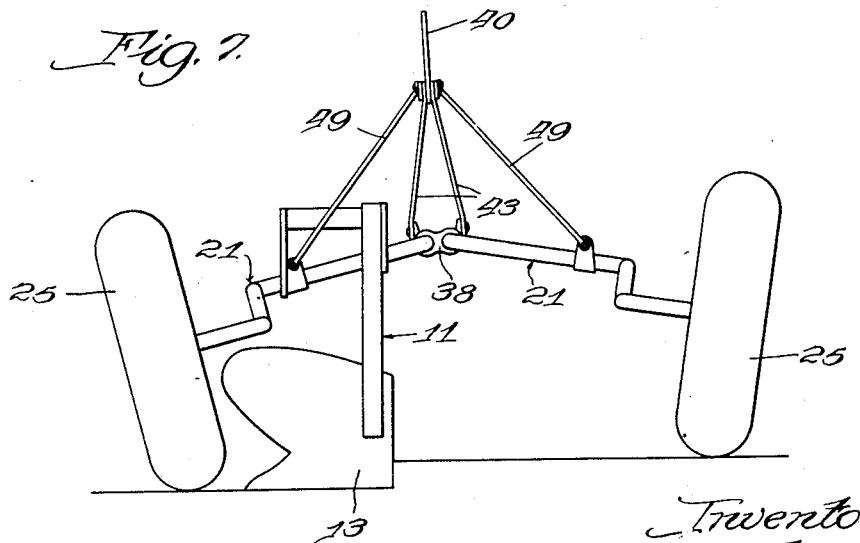

Patented May 4, 1948

2,440,782

UNITED STATES PATENT OFFICE 2,440,782

TWO-WAY PLOW

John R. Orelind, Wilmette, Ill., assignor to International Harvester Company, a corporation of New Jersey Application May 15, 1944, Serial No. 535,633

15 Claims. (Cl. 97—29)

This invention relates to agricultural implements and, more particularly, to a two-way plow of the trailing type having a pair of plow units arranged for alternate operation.

Two-way plows are well known in the agricultural industry. Their operation permits the cutting of adjacent furrows, the rear wheel on one side or the other of the tractor by which the plow is drawn being adapted to always travel in the previously made furrow as the plow moves back and forth across the field. This is essential to establish the position that the alternately working plow bottom must occupy with respect to the tractor wheel traveling in the furrow in order to maintain a uniform width of cut.

One of the objects of this invention is the provision of a novel two-way plow adapted to be propelled by a tractor and to assume the proper plowing relationship with the furrow wheel of the tractor.

Another object is the provision of a two-way plow having means for simultaneously leveling the plow and adjusting its depth of operation.

Another object is to provide a two-way plow of novel construction wherein the alternately operable plow units are hingedly connected for relative movement about a longitudinal axis.

Still another object is to provide, in a two-way plow having hingedly connected plow units, a mechanism for laterally shifting the plow hitch in response to alternate operation of the units, irrespective of the relative angularity of the plow units.

Other objects and advantages of the invention will become clear from the following detail description when read in conjunction with the accompanying drawings, wherein:

Figure 1 is a view in perspective of a plow embodying the features of the present invention;

Figure 2 is a detail in perspective showing the method of joining the axles of the plow shown in Figure 1;

Figure 6 is a schematic elevation of the plow in operating position showing the relationship of parts; and Figure 7 is a view similar to Figure 6 with the left-hand plow unit operating at a shallower depth, and showing the new angle assumed by the axles.

Figure 3:
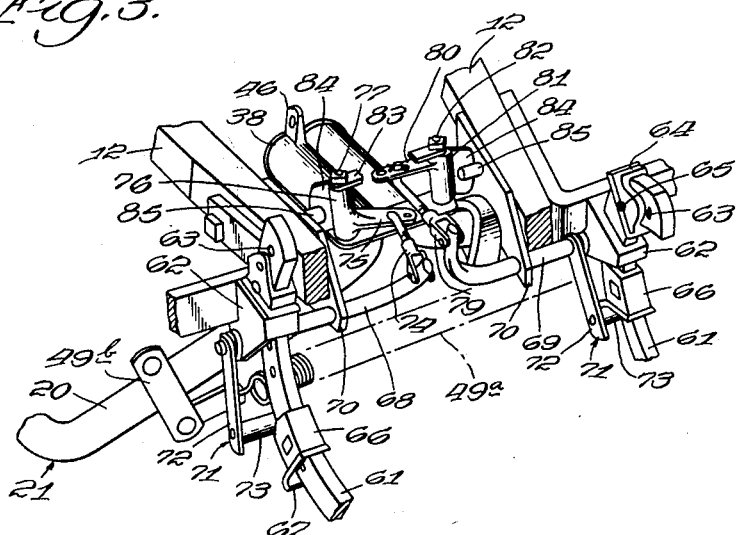
Figure 3 is a detail in perspective and partly in section of a portion of the plow of Figure 1.

In the drawings, the plow of the present invention is shown as including a pair of laterally spaced, longitudinally extending right- and left-hand plow units 10 and 11, respectively. The structure of each of these plow units is substantially the same, and a description of one will suffice for both. Each plow unit comprises a longitudinally extending beam 12 curved downwardly at its rear end and having affixed thereto a plow bottom 13. The plow bottoms on the units 10 and 11 are respectively right- and left-hand bottoms and are adapted for alternate operation when the plow reverses its direction in a field.

Laterally spaced from beam 12 is a brace 14 extending forwardly to a point in alinement with the forward end of beam 12 and bent rearwardly for attachment by bolts 15 to beam 12 near its rear end. The spaced forward portion of brace 14 is affixed to beam 12 by a spacer 16 having a transverse portion 17. Attached to beam 12 and brace 14 are depending, laterally spaced bearing brackets 18 and 19 having bearing portions adapted to receive for rotation the transverse portion 20 of a crank axle 21 having a rearwardly bent arm portion 22 at the outer end thereof.

Figure 5:
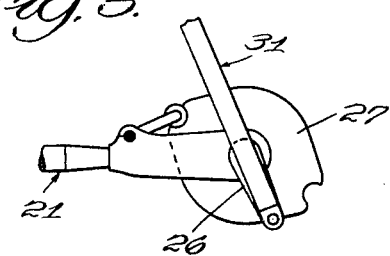
Figure 5 is a detail of a portion of the lifting mechanism.

To the rearwardly extending end of arm 22 is attached a housing 23, in which is mounted a transversely extending stub shaft 24 journaling a supporting wheel 25. The inner end of shaft 24 extending through the housing 23 is provided with a crank 26 (see Figure 5) adapted to be intermittently rotated through the actuation of a half-revolution clutch 27 of conventional construction, actuated by a trip lever 28, having attached thereto a rope 29 extending forwardly to a position accessible to the operator of a vehicle, by which the plow of the present invention may be drawn. A simple pull upon the rope 29 thus releases the clutch 27 to cause rotation of the crank 26, the clutch being normally biased to locked position by a spring 30 connecting lever 28 to housing 23. Lifting of the plow units is accomplished through rotation of wheel 25 and actuation of clutch 27 by a link 31 connecting crank 26 with brace 14. This link 31 comprises a sleeve member 32 and a threaded crank member 33 received in the sleeve 32, the upper end of the sleeve being pivotally mounted between a strap 34 and the brace 14. The forward end of strap 34 is affixed to brace 14 by a bolt 35, and the rear end thereof spaced from the brace is connected thereto by an angle member 36. Crank 26 actuated by clutch 27 is adapted to rotate through one half of a revolution each time the lever 28 is tripped. Thus, movement of wheel 25, operating through clutch 27, crank 26, and link 31, is transmitted to the plow units 10 and 11 to move them vertically about their pivot upon the transverse portion 20 of axle 21. Link 31 is made extensible in order to adjust the depth of operation of each of the plow elements 10 and 11 independently by varying the relationship of beam 12 to wheel 25. This adjustment is accomplished by manipulation of the crank 33.

The plow units 10 and 11 are similarly equipped with lifting mechanism so that the units may be independently lifted for alternate operation, or they may both be placed in raised position for transport purposes.

The inner end of each crank axle 21 is provided with a rearwardly bent portion 37 extending rearwardly and generally parallel to the outer arm portion 22. The portions 37 of each crank axle 20 are in juxtaposition and mounted for pivotal movement about the axis of portion 37 in a bearing member 38 extending a substantial part of the length of the portions 37 to hold them securely in place while permitting independent pivotal movement thereof. This may be observed particularly well in Figure 2. Suitable means such as cotter pins may be utilized to prevent displacement of the axles from the bearing member 38.

Bearing 38 serves as a support for an adjusting mechanism generally indicated at 39 and including a quadrant 40 and a lever 41 pivoted at 42 thereupon for movement thereover. Likewise attached to quadrant 40 at 42 are downwardly extending legs 43, the lower ends of which are attached to upwardly extending lugs 44 at the forward end of bearing 38. A strap 45, likewise attached to the quadrant and extending downwardly and rearwardly, is secured to a lug 46 at the rear end of bearing 38. Quadrant 40 is further braced by a strap 46ᵃ extending from strap 45 to an arcuate portion of quadrant 40. The customary detent mechanism 47 is provided for engagement in notches 48 of the quadrant.

Attached to the lever 41 at a point spaced somewhat from its pivot 42 is a pair of rods 49, each of which extends downwardly and outwardly and is connected to the transverse portion 20 of axle 21.

At this point it should be clear that axles 21 are restrained from pivotal movement about the axes of portions 27 by the adjusting mechanism 39. Likewise, it should be clear that movement of the arm 41 over the quadrant 40 will exert a force through the rods 49 to cause pivotal movement of axles 21. Thus axles 21 may be laterally tilted with respect to each other to any desired angle within the limits of the adjusting mechanism 39 for a purpose that will hereinafter become clear. Axles 21 on each side of the plow are urged to pivotal movement about the axes of the portions 37 by a spring 49ᵃ connected to brackets 49ᵇ on the axles 21.

As pointed out before, the plow of the present invention is a two-way plow having units adapted for alternate operation; that is, when the plow is traveling in one direction, one of the plow bottoms is in operating position while the other plow bottom is raised, and when the direction of travel of the plow is reversed, the other plow bottom is placed in operation. The depth of operation of the plow bottom, that is, the depth at which the plow bottom penetrates the soil, is in part regulated by the adjusting mechanism 39 above described. This adjusting mechanism causes the crank axles 21, upon which the plow units are mounted for vertical pivotal movement, to assume various angular positions with respect to each other, the depth of plowing varying with the degree of angularity. The change in angle assumed by the axles when changing from deep to shallow plowing is illustrated in Figures 6 and 7. Since manipulation of the adjusting mechanism 39 causes lateral tilting of the plow units 10 and 11 in the manner of a hinge, this adjusting mechanism likewise serves simultaneously for leveling the plow bottoms. If desired, additional means, not shown, may be provided for adjusting the angle of each plow bottom with respect to its associated crank axle. Independent adjustment of the plow for securing greater control of the operating depth of the plow units is effected by manipulation of the crank 33, which regulates the position of the plow bottom with respect to its adjacent wheel. This adjusting device is principally useful in securing proper adjustment at the beginning of a plowing operation and when changing the air pressure in pneumatic tires.

At the forward end of beam 12 and mounted between the beam 12 and its associated brace 14 is a king bolt 50 upon which is pivoted for forward and rearward rocking movement a member 51. Member 51 includes a yoke 52 having arms apertured to receive the bolt 50 for pivotal movement thereupon and a depending shank portion adapted to receive for telescoping movement a shaft 53. Shaft 53 is provided with a plurality of openings 53ᵃ for the reception of a pin 53ᵇ passing through the yoke 52 to adjust the length of the member 51 to a number of positions. To the lower end of shaft 53 is connected a coupling 54. To the coupling 54 for right-hand plow unit 10 is connected for pivotal movement a forwardly extending hitch member 55, and to coupling 54 for plow unit 11 is connected a hitch member 56. Hitch members 55 and 56 extend forwardly, and member 56 is connected to member 55 at 57, thus forming a triangular hitch frame 58. The forward end of the hitch member 55 is provided with a clevis 59 for attachment to the draw-bar of a tractor or other source of draft power.

It should now be understood that a two-way plow has been described having alternately operable plow units and longitudinally pivotable members on the front ends thereof, whereby the hitch frame 58, which serves to connect the plow to a tractor or other vehicle, may be permitted to move laterally to cause the working plow unit to assume the correct plowing position with respect to its adjacent tractor wheel and produce furrows of uniform width as the plow travels back and forth across the field. Assuming the tractor drive wheels to be of a certain lateral spacing, the plow bottoms will assume correct plowing position with regard to the respective tractor wheels without movement of the hitch point. On the other hand, if a tractor be employed having a narower or wider rear wheel spacing, the hitch point must be moved laterally in one direction or the other to permit the supporting wheel of the working plow unit to travel in the previously made furrow behind the adjacent tractor wheel. To accomplish this purpose, one of the members 51 must be allowed to pivot while the other is held rigid. For this reason a locking mechanism is provided for each pivotable member 51, which may be automatically released in response to movement of the plow bottoms to working position. The mechanism by which this is accomplished is to be presently described.

Attached to the lower end of yoke 52 by bolts 60 is a rearwardly and upwardly curved arcuate member 61 which is slidably received in a bracket 62 attached to the transverse portion 17 of spacer 16. Member 61 is provided with a plurality of openings 63, and an adjustable stop member 64 is provided having a pin 65 receivable in one of the openings 63. Member 64 is adapted to abut against the upper edge of bracket 62 to serve as a stop and to limit the telescoping movement of member 61 in bracket 62. Another stop member 66 is provided on member 61 and has a rearwardly extending overlapping lip 67. Maximum telescoping movement of member 61 in bracket 62 is obtained by placing the pin 65, holding stop member 64, in one of the rearmost openings 63. Then pivotable member 51 has longitudinal rocking movement within a range determined by the distance between the stop members 62 and 66. When no extension of the telescoping parts is desired, as when the plow is drawn behind a tractor having a rear wheel spacing requiring substantially no movement of the plow hitch frame in order to correctly position the working plow bottom with respect to its adjacent tractor wheel, the pin 65 is withdrawn and the stop 64 moves downwardly and forwardly on the member 61 until the pin can be inserted in one of the forwardmost openings 63. In this position the stops 64 and 66 are closely adjacent on opposite sides of the bracket 62.

The plow of the present invention has been designed to trail behind a tractor having a rear wheel spacing of approximately sixty-four inches without movement of the telescoping parts, without rocking movement of member 51, and without lateral movement of the hitch frame 58 other than that caused by the slight rearward deflection of the lower end of one of the pivotable members 51 due to the angle assumed by the raised plow unit. For extremes of narrow and wide tractor wheel spacings, as for example forty and eighty-four inch spacings, the stops 64 are moved to a position near the end of arcuate member 61, as indicated in Figure 1, thus securing maximum extension of the telescoping parts. The other openings 63 may be utilized to vary the extent of movement of the telescoping parts, and therefore lateral movement of the hitch frame 31, to conform to tractor wheel spacings of varying widths. It will be noted that in Figure 1, and in the solid lines in Figure 4, the plow is shown being drawn by a tractor having a rear wheel spacing of eighty-four inches. It will also be noted that the right-hand plow unit is in working position, and that the right-hand pivotable member 51 has been moved forwardly and the left-hand pivotable member moved rearwardly to cause lateral movement of the hitch frame 58 to the left, thus bringing the working plow bottom into correct plowing position with respect to the right-hand tractor wheel, as indicated diagrammatically in Figure 4. Conversely, when the direction of plowing is reversed and the left-hand plow unit replaces the right-hand unit in working position, the left-hand member 51 must be moved forwardly and the right-hand member 51 retracted to cause hitch frame 58 to move to the right and bring the working plow bottom into correct position with respect to the left-hand tractor wheel.

Figure 4:
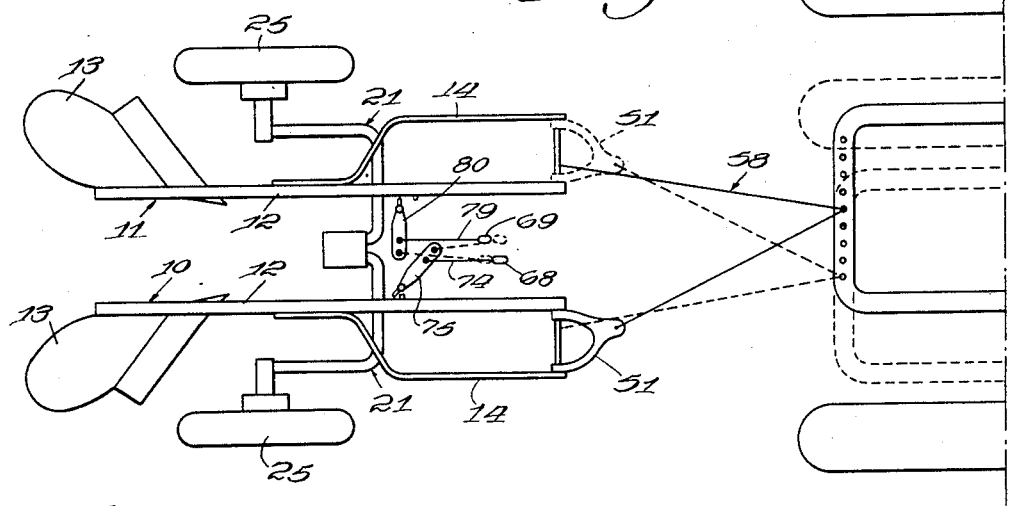
Figure 4 is a diagrammatic illustration of the plow of the present invention attached to be drawn behind tractors of different widths.

On the other hand, when, as indicated in dotted lines in Figure 4, a tractor having a rear wheel spacing of forty inches is employed, in order for the right-hand plow bottom to assume proper relationship with the right-hand tractor wheel, the left-hand pivotable member 51 must be moved forwardly and the hitch frame 58 moved to the right and vice versa upon reversing the direction of plowing. These movements of the hitch frame are actuated by movement of the inoperative plow unit to working position through the intermediary of a mechanism now to be described.

As pointed out before, maximum extension of the telescoping parts 61 and 62 is obtained when the pin 65 is inserted in one of the rearmost openings 63 in arcuate member 61. These parts are held against extension when the plow is in transport position by a locking device, and the lock on one plow unit is released when one plow bottom is lowered to working position. This locking mechanism and the means by which it is actuated include a pair of transverse shafts 68 and 69 rotatably mounted in openings in brackets 70 affixed to the beams 12 and extending through openings in brackets 62. Upon the portions of shafts 68 and 69 extending through the bracket 62 are affixed rockers 71. Each rocker 71 comprises a pair of laterally spaced straps 72, the lower depending ends of which are separated by a roller 73. The inner end of shaft 68 is bent upwardly and is connected by an adjustable link 74 to an arm 75 projecting outwardly from the lower end of a sleeve member 76 mounted upon a bolt 77 seated in a flange 78 which is a part of the bearing member 38. The inner end of shaft 69 is bent in a manner similar to shaft 68 and similarly connected by an adjustable link 79 to an arm 80 projecting outwardly from the upper end of a sleeve 81 mounted upon a bolt 82 seated in flange 78 at a point laterally spaced from the bolt 77. The upper ends of bolts 77 and 82 are connected by a brace 83. Sleeves 76 and 81 are provided with outwardly projecting flanges 84 adapted to engage pegs 85 projecting from brackets 70, as is clearly shown in Figure 3. Each of the arms 75 and 80 is connected, respectively, by springs 86 and 87 to a lug 88 projecting upwardly from bearing member 38, thus biasing said arms rearwardly.

In Figure 1 it will be noted that the right-hand plow unit is in working position, and that the left-hand plow unit is raised. In this position the left-hand pivotable member 51 is locked by insertion of the roller 73 of the locking mechanism under the lip portion 67 of stop 66 while the right-hand locking member has been released. Assuming now that it is desired to reverse the direction of plowing, and that plow unit 11 is to replace plow unit 10 in working position, the operator then pulls on the rope 29 on each side of the plow in order to actuate the clutches 27 and cause plow unit 11 to descend to working position while plow unit 10 rises to transport position. As shown clearly in Figure 3, as plow unit 11 descends, the pin 85 engaging flange 84 rotates sleeve 81 about the bolt 82 and causes arm 80 to move forwardly. This movement of arm 80 acts through link 79 and the upturned portion of shaft 69 to rotate shaft 69 on its axis and move rocker 71 out of engagement with stop 66. At the same time as the plow unit 10 rises, the pin 85 associated therewith moves forwardly, and arm 7, urged by its spring 86 moves rearwardly rocking shaft 68 in a direction opposite to that of shaft 69. At the same time, draft upon the plow, causing forward pivoting of left-hand member 51, also causes retraction of right-hand member 51 and telescoping movement of its associated member 61. When stop 66 on the right-hand member 61 reaches a position adjacent the rocker 71, the lip portion 67 thereof is engaged by the roller 73. Thus, in Figure 1, and in full lines in Figure 4, the plow of the present invention is shown as being drawn behind a tractor having a rear wheel spacing of eighty-four inches.

When the plow is to be drawn behind a tractor having a rear wheel spacing of forty inches, as indicated in dotted lines in Figure 4, it is necessary that when the right-hand plow unit is to be placed in working position, the left-hand pivotable member be moved forwardly and the right-hand pivotable member moved rearwardly in order that the hitch frame 58 may be swung to the right. This brings the right-hand plow unit into correct plowing position with respect to the right-hand tractor wheel. In order to accomplish this, only a simple adjustment is required. As will be noted in Figures 3 and 4, the arms 75 and 80 are provided with two openings for the reception of the respective links 74 and 79. Now link 74 is released from arm 75 and connected instead to arm 80, while link 79 is released from its connection with arm 80 and transferred to arm 75, as indicated in dotted lines in Figure 4. With this arrangement, when the right-hand plow unit 10 is to be placed in working position, the pin 85 associated therewith moves rearwardly as the plow unit drops and urges flange 84 rearwardly and arm 75 forwardly rotating shaft 69 to release rocker 71 on the left-hand side of the tractor from its engagement with stop 66, thus permitting telescoping of the arcuate member 61 in bracket 62. At the same time as plow unit 11 is raised to inoperative position, its associated pin 85 moves forwardly, arm 80 moves rearwardly, and through its connecting link 74, rotates shaft 68 to cause roller 73 to engage the lip 67 on stop 66 on the right-hand side of the plow as the member 51 is moved rearwardly in response to draft upon the draft frame.

When both of the plow units 10 and 11 have been raised to inoperative position for transport purposes, a mechanism is provided to offset the weight at the rear of the plow beams 12 in order to hold the plow bottoms in the air. This mechanism comprises a chain 89 attached at its forward end to a clip 90 connected at 57 to the hitch frame 58. The rear end of chain 89 is connected to the quadrant 40 by a yoke 91.

It should now be understood that a novel two-way plow has been described wherein means are provided for lateral tilting of one of the plow units with respect to the other, the units being mounted upon separate crank axles which are hingedly connected together for pivotal movement about a longitudinal axis. Likewise, novel means have been provided for adjusting the relative angularity of the two plow units by which the depth of operation thereof may be adjusted at the same time that the plow units are leveled.

Having described the invention in its preferred embodiment, it should be understood that modifications may be made therein without departing from the spirit of the invention or the scope of the appended claims.

What is claimed is:

1. A two-way plow comprising a pair of laterally spaced plow units adapted for plowing in opposite directions, each said unit including a crank axle, a longitudinally extending plow beam pivotally mounted on each said axle for vertical movement, a supporting wheel on each said axle, and means for connecting said plow units together for hinged movement on a longitudinal axis to provide for lateral tilting of one unit with respect to the other.

2. A two-way plow comprising a pair of laterally spaced plow units adapted for plowing in opposite directions, each said unit including a crank axle, a longitudinally extending plow beam pivotally mounted on each said axle for vertical movement, a supporting wheel on each said axle, means for connecting said plow units together for hinged movement on a longitudinal axis to provide for lateral tilting of one unit with respect to the other, and adjusting means for effecting relative lateral tilting of said units.

3. A two-way plow comprising a pair of laterally spaced plow units adapted for plowing in opposite directions, each said unit including a crank axle, a longitudinally extending plow beam pivotally mounted on each said axle for vertical movement, a supporting wheel on each said axle, means for connecting said plow units together for hinged movement on a longitudinal axis to provide for lateral tilting of one unit with respect to the other, and single adjusting means for simultaneously effecting relative lateral tilting of said units.

4. A two-way plow comprising a pair of laterally spaced plow units adapted for plowing in opposite directions, each said unit including a crank axle, a longitudinally extending plow beam pivotally mounted on each said axle for vertical movement, a supporting wheel on each said axle, means for connecting said plow units together for hinged movement on a longitudinal axis to provide for lateral tilting of one unit with respect to the other, adjusting means for effecting relative lateral tilting of said units, power means associated with each said wheel for vertically moving said plow units, and independent adjusting means on each plow unit for varying the operating depth thereof.

5. A two-way plow comprising a pair of laterally spaced plow units adapted for plowing in opposite directions, each said unit including a crank axle having a transverse portion and generally parallel longitudinally extending inner and outer portions, a supporting wheel on each said outer portion, a hinged connection between the inner portions of said crank axles to provide for lateral tilting of one unit with respect to the other, and single adjusting means for effecting relative lateral tilting of said units.

6. A two-way plow comprising a pair of laterally spaced plow units adapted for plowing in opposite directions, each said unit including a crank axle having a transverse portion and generally parallel longitudinally extending inner and outer portions, a supporting wheel on each said outer portion, and rigid connecting means between the inner portions of said crank axles arranged to prevent pivoting of said axles about a transverse axis but to provide for lateral tilting thereof about a longitudinal axis.

7. A two-way plow comprising a pair of laterally spaced plow units adapted for plowing in opposite directions, each said unit including a crank axle having a transverse portion and generally parallel longitudinally extending inner and outer portions, a supporting wheel on each said outer portion, a longitudinally extending bearing between said units, means for pivotally mounting the inner portions of said crank axles in said bearing for lateral tilting of one unit with respect to the other about the axis of said inner portion, and single adjusting means for simultaneously effecting relative lateral tilting of said units.

8. A two-way plow comprising a pair of laterally spaced plow units adapted for plowing in opposite directions, each said unit including a crank axle having a transverse portion and generally parallel longitudinally extending inner and outer portions, a supporting wheel on each said outer portion, a longitudinally extending bearing sleeve between said units, means for pivotally mounting the inner portions of said crank axles in said bearing sleeve for lateral tilting of one unit with respect to the other about the axis of said inner portion, and means for preventing pivoting of said units including means for adjusting the relative angular relationship of said units about said axes.

9. A two-way plow comprising a pair of laterally spaced plow units adapted for plowing in opposite directions, each said unit including a crank axle having a transverse portion and generally parallel longitudinally extending inner and outer portions, a supporting wheel on each said outer portion, a longitudinally extending bearing sleeve between said units, means for pivotally mounting the inner portions of said crank axles in said bearing sleeve for lateral tilting of one unit with respect to the other about the axis of said inner portion, and means associated with said bearing sleeve and supported thereby for pivoting said units about the axes of said inner portions to vary the angular relationship of said units.

10. A two-way plow comprising a pair of laterally spaced plow units adapted for plowing in opposite directions, each said unit including a crank axle having a transverse portion and generally parallel longitudinally extending inner and outer portions, a supporting wheel on each said outer portion, a longitudinally extending bearing sleeve between said units, means for pivotally mounting the inner portions of said crank axles in said bearing sleeve for lateral tilting of one unit with respect to the other about the axis of said inner portion, a lever and quadrant arrangement mounted on said bearing sleeve, and means operatively connecting said lever and each said axle, whereby said axles may be simultaneously pivoted to vary the angular relationship of said units.

11. A two-way plow comprising a pair of laterally spaced plow units adapted for plowing in opposite directions, each said unit including a crank axle having a transverse portion and generally parallel longitudinally extending inner and outer portions, a supporting wheel on each said outer portion, a longitudinally extending bearing sleeve between said units, means for pivotally mounting the inner portions of said crank axles in said bearing sleeve for lateral tilting of one unit with respect to the other about the axis of said inner portion, and means for simultaneously leveling said plow units and adjusting the operating depth thereof, comprising a quadrant supported on said bearing sleeve, a lever movable over said quadrant, and means operatively connecting said lever and said axles for effecting simultaneous pivoting thereof.

12. In a two-way plow, a pair of laterally spaced plow units adapted for alternate operation, each said unit including a crank axle, a supporting wheel on said axle, and a longitudinally extending plow beam mounted on said axle for vertical pivotal movement, power means associated with each said wheel for independently vertically moving said plow units, independent adjusting means on each plow unit for varying the operating depth thereof, and means hingedly connecting said axles for relative lateral tilting of said units.

13. In a two-way plow, a pair of laterally spaced plow units adapted for alternate operation, each said unit including a crank axle having a transverse portion, a supporting wheel on said axle, and a longitudinally extending plow beam mounted on the transverse portion of said axle for vertical pivotal movement, lifting means operatively connecting each said wheel and its associated beam for independently vertically moving said beam, means hingedly connecting said crank axles for lateral tilting about longitudinal axes, adjusting means for laterally tilting said axles to a variety of angular positions, a hitch frame connected with the forward ends of said beams, and adjustable means interconnecting each said beam and said hitch frame for causing lateral movement of said hitch frame in response to vertical movement of one of said beams irrespective of the angular relationship of said axles.

14. In a two-way plow, a pair of laterally spaced plow units adapted for alternate operation, each said unit including a crank axle having a transverse portion and longitudinally angled generally parallel end portions, a supporting wheel on the outer end portion of each said axle, a member connecting the inner end portions of said axles for pivotal movement about the axes of said inner end portions, a longitudinally extending plow beam mounted on each said transverse portion for vertical movement, lifting means operatively connecting each said wheel and its associated beam for independently vertically moving said beam, including means for adjusting the operating depth of the plow unit, single means for simultaneously pivoting said axles to vary the angular relationship of said units, a hitch frame connected with the forwards ends of said beams, and adjustable means interconnecting each said beam and said hitch frame and actuable by vertical movement of said beam to cause lateral movement of said hitch frame irrespective of the angular relationship of said plow units.

15. A two-way plow comprising a pair of laterally spaced plow units adapted for plowing in opposite directions, each said unit including a crank axle, a longitudinally extending plow beam mounted on said axle for vertical movement, a supporting wheel on each said axle, power lift means for independently vertically moving said beams, means for connecting said plow units together for lateral tilting of one unit with respect to the other about a longitudinal axis, a hitch frame connecting the forward ends of said beams, and adjustable means interconnecting each said beam and said hitch frame for causing lateral movement of said hitch frame in response to vertical movement of one of said beams irrespective of the angular relationship of said plow units.

JOHN R. ORELIND.

REFERENCES CITED

The following references are of record in the file of this patent:

UNITED STATES PATENTS

| Number | Name | Date |
|---|---|---|
| 613,454 | Maddocks | Nov. 1, 1898 |
| 847,258 | Parenti | Mar. 12, 1907 |
| 1,260,079 | Sivley | Mar. 19, 1918 |
| 1,279,588 | Richefeu | Sept. 24, 1918 |
| 1,410,917 | Hee | Mar. 28, 1922 |
| 1,503,722 | Strickland | Aug. 5, 1924 |

FOREIGN PATENTS

| Number | Country | Date |
|---|---|---|
| 440,520 | Germany | Feb. 10, 1927 |
| 514,847 | Great Britain | Nov. 20, 1939 |